(12) United States Patent
Farsch et al.

(10) Patent No.: US 11,199,143 B2
(45) Date of Patent: Dec. 14, 2021

(54) INTERNAL COMBUSTION ENGINE, MOTOR VEHICLE COMPRISING SAME, AND METHOD FOR OPERATING AN INTERNAL COMBUSTION ENGINE

(71) Applicant: Bayerische Motoren Werke Aktiengesellschaft, Munich (DE)

(72) Inventors: Hans-Juergen Farsch, Munich (DE); Dirk Christian Leinhos, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/829,098

(22) Filed: Mar. 25, 2020

(65) Prior Publication Data

US 2020/0271063 A1 Aug. 27, 2020

Related U.S. Application Data

(63) Continuation of application No. PCT/EP2018/083464, filed on Dec. 4, 2018.

(30) Foreign Application Priority Data

Dec. 4, 2017 (DE) ...................... 10 2017 221 747.2

(51) Int. Cl.
*F02D 41/00* (2006.01)
*F02B 39/10* (2006.01)
(Continued)

(52) U.S. Cl.
CPC .......... *F02D 41/0007* (2013.01); *F02B 39/10* (2013.01); *F01N 13/107* (2013.01);
(Continued)

(58) Field of Classification Search
CPC .... F01N 13/107; F02B 37/001; F02B 37/007; F02B 37/04; F02B 37/162; F02B 37/18;
(Continued)

(56) References Cited

U.S. PATENT DOCUMENTS 6,205,786 B1 * 3/2001 Hasler ................... F02B 37/013
60/612
6,874,463 B1 4/2005 Bolander et al.
(Continued)

FOREIGN PATENT DOCUMENTS

CN 103184926 A 7/2013
CN 104141529 A 11/2014
(Continued)

OTHER PUBLICATIONS

Translation DE102015015101, Arnold.*
(Continued)

*Primary Examiner* — Jesse S Bogue
(74) *Attorney, Agent, or Firm* — Crowell & Moring LLP

(57) ABSTRACT

An internal combustion engine has two cylinder banks, an electrical compressor, and at least one turbocharger, in which a first shut-off valve, which is arranged in the line leading from an e-compressor outlet to air-collecting devices of the cylinder banks, can at least release and block a throughflow through the line. A method operates the internal combustion engine, by which the internal combustion chamber is operated symmetrically or asymmetrically, depending on the engine speed.

11 Claims, 2 Drawing Sheets

(51) Int. Cl.
*F01N 13/10* (2010.01)
*F02B 37/007* (2006.01)
*F02B 37/18* (2006.01)
*F02D 23/00* (2006.01)

(52) U.S. Cl.
CPC ............. *F02B 37/007* (2013.01); *F02B 37/18* (2013.01); *F02D 23/00* (2013.01)

(58) Field of Classification Search
CPC ...... F02B 39/10; F02D 23/00; F02D 41/0007; F02D 41/0082; F02M 35/10157; F02M 35/10275; F02M 35/116; Y02T 10/12
See application file for complete search history.

(56) References Cited

U.S. PATENT DOCUMENTS

| | | | |
|---|---|---|---|
| 6,938,420 B2* | 9/2005 | Kawamura | F02D 41/0007 60/612 |
| 7,165,403 B2 | 1/2007 | Sun et al. | |
| 7,383,119 B2 | 6/2008 | Lewis | |
| 7,703,284 B2 | 4/2010 | Becker et al. | |
| 7,926,270 B2 | 4/2011 | Weaver et al. | |
| 8,281,761 B2* | 10/2012 | Theilemann | F02M 35/112 123/184.42 |
| 9,200,578 B2 | 12/2015 | Flohr | |
| 10,196,967 B2* | 2/2019 | Rutschmann | F02B 37/04 |
| 2007/0186898 A1 | 8/2007 | Wu et al. | |
| 2009/0183506 A1* | 7/2009 | Trombetta | F02B 37/004 60/599 |
| 2011/0174256 A1 | 7/2011 | Aso et al. | |
| 2013/0008161 A1 | 1/2013 | Flohr | |
| 2013/0167528 A1 | 7/2013 | Schlund et al. | |
| 2016/0010576 A1 | 1/2016 | Primus et al. | |
| 2016/0138491 A1 | 5/2016 | Casal Kulzer et al. | |
| 2016/0146140 A1* | 5/2016 | Fimml | F02D 13/0226 123/52.1 |
| 2016/0258348 A1* | 9/2016 | Rutschmann | F02B 29/0475 |
| 2017/0058792 A1 | 3/2017 | Bartsch et al. | |
| 2017/0159580 A1 | 6/2017 | Han et al. | |
| 2017/0260916 A1 | 9/2017 | Kraemer et al. | |
| 2017/0292439 A1 | 10/2017 | Rothenberger et al. | |
| 2018/0051642 A1 | 2/2018 | Park et al. | |
| 2019/0128219 A1* | 5/2019 | Han | F01N 3/10 |

FOREIGN PATENT DOCUMENTS

| | | |
|---|---|---|
| CN | 105604685 A | 5/2016 |
| CN | 106481444 A | 3/2017 |
| CN | 106958489 A | 7/2017 |
| CN | 107178417 A | 9/2017 |
| CN | 107269385 A | 10/2017 |
| DE | 10 2008 055 896 A1 | 5/2010 |
| DE | 10 2010 007 601 A1 | 8/2011 |
| DE | 10 2013 213 697 A1 | 1/2015 |
| DE | 10 2015 015 101 B3 | 3/2017 |
| DE | 10 2016 124 486 A1 | 2/2018 |
| GB | 2 386 924 A | 10/2003 |
| WO | WO 2008/139302 A1 | 11/2008 |

OTHER PUBLICATIONS

International Search Report (PCT/ISA/210) issued in PCT Application No. PCT/EP2018/083464 dated Feb. 13, 2019 with English translation (six (6) pages).

German-language Written Opinion (PCT/ISA/237) issued in PCT Application No. PCT/EP2018/083464 dated Feb. 13, 2019 (six (6) pages).

German-language Office Action issued in German Application No. 102017221747.2 dated Oct. 12, 2018 (five (5) pages).

Chinese-language Office Action issued in Chinese Application No. 201880063892.6 dated May 28, 2021 with English translation (19 pages).

* cited by examiner

INTERNAL COMBUSTION ENGINE, MOTOR VEHICLE COMPRISING SAME, AND METHOD FOR OPERATING AN INTERNAL COMBUSTION ENGINE

CROSS REFERENCE TO RELATED APPLICATIONS

This application is a continuation of PCT International Application No. PCT/EP2018/083464, filed Dec. 4, 2018, which claims priority under 35 U.S.C. § 119 from German Patent Application No. 10 2017 221 747.2, filed Dec. 4, 2017, the entire disclosures of which are herein expressly incorporated by reference.

BACKGROUND AND SUMMARY OF THE INVENTION

The invention relates to an internal combustion engine with at least one exhaust gas turbocharger and an electric compressor, to a motor vehicle with an internal combustion engine of this type, and to a method for operating an internal combustion engine.

In the case of internal combustion engines with a plurality of cylinder banks (V8, V12, boxer engine, etc.), a torque of the internal combustion engine can be improved by way of an e-compressor in a steady-state (that is to say, at a defined operating point) and transient manner (that is to say, in dynamic operation). If, for example, each cylinder bank is assigned a dedicated exhaust gas turbocharger, by which the pressurized air is also fed to the electric compressor/compressors, various integrations of the electric compressor/compressors are conceivable.

For instance, two electric compressors can be provided, each cylinder bank being assigned an electric compressor (variant 1). Furthermore, a single electric compressor might be integrated symmetrically, that is to say it sucks in from the two exhaust gas turbochargers and feeds into the two cylinder banks (variant 2). Moreover, it is conceivable for a single electric compressor to be integrated asymmetrically, that is to say it sucks in from a single exhaust gas turbocharger and feeds only into that cylinder bank which is assigned to said exhaust gas turbocharger (variant 3).

Variant 1 would be expensive and difficult in practice with regard to the space requirement. In the case of variant 2, the degrees of efficiency of the electric compressors deteriorate at relatively high rotational speeds of the internal combustion engine. Variant 3 would lead to a pronounced unequal distribution of the power output of the cylinder banks, above all at low rotational speeds of the internal combustion engine.

It is therefore an object of the present invention to eliminate the abovementioned disadvantages at least partially. This object is achieved by way of an internal combustion engine, a method, and a motor vehicle in accordance with the claimed invention.

In accordance with one exemplary embodiment of the invention, an internal combustion engine is provided, with a first cylinder bank and a second cylinder bank, a plurality of combustion chambers being configured in each of the cylinder banks; a first air collector apparatus which is assigned to the first cylinder bank and from which air can be fed to the combustion chambers of the first cylinder bank; a second air collector apparatus which is assigned to the second cylinder bank and from which air can be fed to the combustion chambers of the second cylinder bank; an electric compressor with an e-compressor inlet and an e-compressor outlet; at least one exhaust gas turbocharger, in each case with a turbine and a compressor, an exhaust gas turbocharger/e-compressor line leading from an outlet of the compressor to the e-compressor inlet; a first e-compressor outlet line, via which the e-compressor outlet is connected to the first air collector apparatus; a second e-compressor outlet line, via which the e-compressor outlet is connected to the second air collector apparatus; a first shut-off member which is arranged in the first e-compressor outlet line and by way of which a throughflow through the first e-compressor outlet line can at least be released and shut off.

The exemplary embodiment has the advantage that a switchover of the internal combustion engine can be carried out by means of the first shut-off member selectively between symmetrical and asymmetrical operation. In particular, this is controlled in a manner which is dependent on the rotational speed of the internal combustion engine. It is thus possible for the internal combustion engine to be operated asymmetrically at high internal combustion engine rotational speeds (for example, >1500 rpm), which leads to gas exchange advantages in the case of the internal combustion engine. This is due to the fact that, in the case of said internal combustion engine rotational speeds, the e-compressor is operated in a more favorable degree of efficiency range in the e-compressor characteristic diagram in asymmetrical operation than would be the case in symmetrical operation. Furthermore, it is possible for the internal combustion engine to be operated symmetrically at low internal combustion engine rotational speeds (for example, <1500 rpm), as a result of which turbo lag is reduced or avoided and the torque of the internal combustion engine can be increased. In the case of said internal combustion engine rotational speeds, symmetrical operation supplies degree of efficiency advantages in the e-compressor characteristic diagram (in comparison with asymmetrical operation) and, moreover, no load differences of the two cylinder banks, which would be greatly pronounced in the case of the asymmetrical variant, in particular at said low rotational speeds.

In accordance with one exemplary embodiment of the invention, the internal combustion engine is configured in such a way that in each case one exhaust gas turbocharger line leads from the outlet of the compressor to the first and second air collector apparatus, and a check valve is arranged in each of the exhaust gas turbocharger lines, which check valve shuts off a flow from the air collector apparatuses to the outlet of the compressor.

In accordance with one exemplary embodiment of the invention, the internal combustion engine has two exhaust gas turbochargers, a first exhaust gas turbocharger and a second exhaust gas turbocharger, a first exhaust gas turbocharger/e-compressor line leading from an outlet of the compressor of the first exhaust gas turbocharger to the e-compressor inlet, a second exhaust gas turbocharger/e-compressor line leading from an outlet of the compressor of the second exhaust gas turbocharger to the e-compressor inlet, a second shut-off member being arranged in the first exhaust gas turbocharger/e-compressor line, by way of which second shut-off member a flow through the first exhaust gas turbocharger/e-compressor line can at least be released and shut off.

In accordance with one exemplary embodiment of the invention, the internal combustion engine is configured in such a way that a third shut-off member is arranged in the second e-compressor outlet line, by way of which third shut-off member the throughflow through the second e-compressor outlet line can at least be released and shut off, and a fourth shut-off member being arranged in the second exhaust gas turbocharger/e-compressor line, by way of which fourth shut-off member the throughflow through the second exhaust gas turbocharger/e-compressor line can at least be released and shut off.

In accordance with one exemplary embodiment of the invention, the internal combustion engine is configured in such a way that a first exhaust gas turbocharger line leads from the outlet of the compressor of the first exhaust gas turbocharger to the first air collector apparatus, a second exhaust gas turbocharger line leading from the outlet of the compressor of the second exhaust gas turbocharger to the second air collector apparatus, and a check valve being arranged in the first exhaust gas turbocharger line and in the second exhaust gas turbocharger line, which check valve in each case shuts off a flow from the air collector apparatuses to the outlets of the compressors.

Moreover, the invention supplies a method for operating an internal combustion engine with a first cylinder bank and a second cylinder bank, a plurality of combustion chambers being configured in each of the cylinder banks, with the steps: feeding of air from a first air collector apparatus which is assigned to the first cylinder bank into the combustion chambers of the first cylinder bank; feeding of air from a second air collector apparatus which is assigned to the second cylinder bank into the combustion chambers of the second cylinder bank; feeding of air from a compressor of at least one exhaust gas turbocharger to an e-compressor inlet of an electric compressor; in a first rotational speed range of the internal combustion engine, feeding of air from an e-compressor outlet of the electric compressor to the first and second air collector apparatus; in a second rotational speed range of the internal combustion engine, feeding of air from the e-compressor outlet of the electric compressor to the second air collector apparatus, while the feed of air from the e-compressor outlet of the electric compressor to the first air collector apparatus is stopped.

In accordance with one exemplary embodiment of the invention, the method is configured in such a way that the first operating range is active at least in a rotational speed range of from 600 to 900 rpm of the internal combustion engine. In particular, the first operating range is active in a rotational speed range of the internal combustion engine up to and including 1500 rpm.

In accordance with one exemplary embodiment of the invention, the method is configured in such a way that the second operating range is active at least in a rotational speed range of from 1700 to 1800 rpm of the internal combustion engine. In particular, the second operating range is active in a rotational speed range of the internal combustion engine above 1500 rpm.

Moreover, the present invention provides a motor vehicle with an internal combustion engine of this type.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
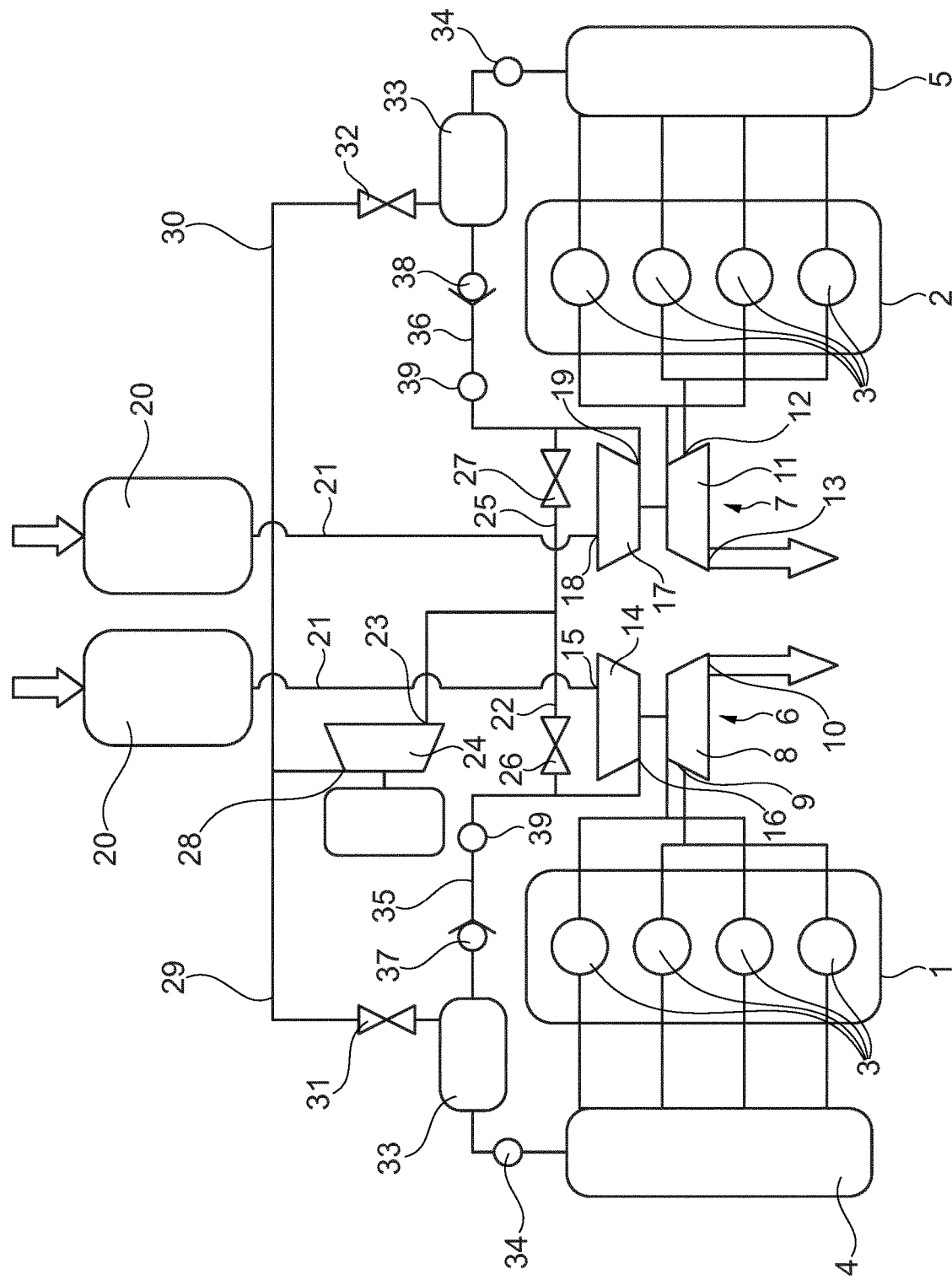
FIG. 1 diagrammatically shows an internal combustion engine in accordance with one exemplary embodiment of the present invention, and FIG. 2 diagrammatically shows an internal combustion engine in accordance with another exemplary embodiment of the present invention.

FIG. 1 diagrammatically shows an internal combustion engine in accordance with one exemplary embodiment. The internal combustion engine has two cylinder banks, namely a first cylinder bank 1 and a second cylinder bank 2, in which in each case a plurality of combustion chambers 3 are configured. Pistons and connecting rods (not shown) of the two cylinder banks 1, 2 act on a common crankshaft (not shown). The first cylinder bank 1 is assigned a first air collector apparatus 4, and the second cylinder bank is assigned a second air collector apparatus 5. Therefore, air can be fed to all the combustion chambers 3 of the first cylinder bank 1 from the first air collector apparatus 4 (and not from the second air collector apparatus 5). Air can be fed to all the combustion chambers 3 of the second cylinder bank 2 from the second air collector apparatus 5 (and not from the first air collector apparatus 4).

Moreover, the first cylinder bank 1 is assigned a first exhaust gas turbocharger 6, and the second cylinder bank 2 is assigned a second exhaust gas turbocharger 7. The first exhaust gas turbocharger 6 has a turbine 8 with an inlet 9 and an outlet 10. The second exhaust gas turbocharger 7 has a turbine 11 with an inlet 12 and an outlet 13. Furthermore, the first exhaust gas turbocharger 6 has a compressor 14 with an inlet 15 and an outlet 16, the turbine 8 being coupled mechanically to the compressor 14 for the transmission of power. The second exhaust gas turbocharger 7 has a compressor 17 with an inlet 18 and an outlet 19, the turbine 11 being coupled mechanically to the compressor 17 for the transmission of power. Exhaust gases of the combustion chambers 3 of the first cylinder bank 1 are fed in via the inlet 9 to the turbine 8 (and not to the turbine 11), and are discharged via the outlet 10 from the turbine 8. Exhaust gases of the combustion chambers 3 of the second cylinder bank 2 are fed via the inlet 12 to the turbine 11 (and not to the turbine 8), and are discharged via the outlet 13 from the turbine 11.

Via respective, optional intake silencers 20 and intake lines 21, ambient air is fed via the inlet 15 to the compressor 14 and via the inlet 18 to the compressor 17.

A first exhaust gas turbocharger/e-compressor line 22 leads from the outlet 16 of the first exhaust gas turbocharger 6 to an e-compressor inlet 23 of an electric compressor 24. A second exhaust gas turbocharger/e-compressor line 25 leads from the outlet 19 of the second exhaust gas turbocharger 7 to an e-compressor inlet 23 of the electric compressor 24. A shut-off member 26 (second shut-off member) is provided in the first exhaust gas turbocharger/e-compressor line 22, by way of which shut-off member 26 a throughflow through the first exhaust gas turbocharger/e-compressor line 22 can be released, shut off and optionally also throttled. In particular, a shut-off member 27 (fourth shut-off member) is also provided in the second exhaust gas turbocharger/e-compressor line 25, by way of which shut-off member 27 a throughflow through the first exhaust gas turbocharger/e-compressor line 22 can be released, shut off and optionally also throttled. The shut-off members which are mentioned in this description can be, for example, a valve, a controllable throttle, a flap or the like. Between the e-compressor inlet 23 and the shut-off members 26 and 27, the exhaust gas turbocharger/e-compressor lines 22 and 25 can be configured as two separate lines, as a combined common line, or both separately in sections and as a common line in sections.

A first e-compressor outlet line 29 leads from an e-compressor outlet 28 of the electric compressor 24 to the first air collector apparatus 4, and a second e-compressor outlet line 30 leads to the second air collector apparatus 5. According to the invention, a shut-off member 31 (first shut-off member) is provided in the first e-compressor outlet line 29, by way of which shut-off member 31 a throughflow through the first e-compressor outlet line 29 can be released, shut off and optionally also throttled. A shut-off member 32 (third shut-off member) is provided in the second e-compressor outlet line 30, by way of which shut-off member 32 a throughflow through the first e-compressor outlet line 30 can be released, shut off and optionally also throttled. Between the e-compressor outlet 28 and the shut-off members 31 and 32, the e-compressor outlet lines 29 and 30 can be configured as two separate lines, as a combined common line, or both separately in sections and as a common line in sections. Intercoolers 33 can also be arranged in each case in the first and second e-compressor outlet lines 29 and 30. Pressure/temperature sensors 34 are usually arranged between the intercoolers 33 and the air collector apparatuses.

A first exhaust gas turbocharger line 35 leads from the outlet 16 of the first compressor 14 of the first exhaust gas turbocharger 6 to the first air collector apparatus 4. A check valve 37 is provided in the first exhaust gas turbocharger line 35, which check valve 37 shuts off a throughflow in the direction from the first air collector apparatus 4 to the outlet 16 and releases a throughflow in the direction from the outlet 16 to the first air collector apparatus 4. A second exhaust gas turbocharger line 36 leads from the outlet 19 of the second compressor 17 of the second exhaust gas turbocharger 7 to the second air collector apparatus 5. A check valve 38 is provided in the second exhaust gas turbocharger line 36, which check valve 38 shuts off a throughflow in a direction from the second air collector apparatus 5 to the outlet 19 and releases a throughflow in the direction from the outlet 19 to the second air collector apparatus 5. Furthermore, in each case one pressure/temperature sensor 39 can also be provided in the exhaust gas turbocharger lines 35 and 36. The intercoolers 33 are preferably arranged downstream of the shut-off members 31 and 32 and the check valves 37 and 38 (that is to say, closer to the air collector apparatuses 1, 2).

That section of the first exhaust gas turbocharger line 35 between the outlet 16 and the check valve 37 (or pressure/temperature sensor 39 if present) and that section of the first exhaust gas turbocharger/e-compressor line 22 between the outlet 16 and the shut-off member 26 can be configured as two separate lines, as a combined common line, or both separately in sections and as a common line in sections. That section of the second exhaust gas turbocharger line 36 between the outlet 19 and the check valve 38 (or pressure/temperature sensor 39 if present) and that section of the second exhaust gas turbocharger/e-compressor line 25 between the outlet 19 and the shut-off member 27 can likewise be configured as two separate lines, as a combined common line, or both separately in sections and as a common line in sections. That section of the first e-compressor outlet line 29 between the shut-off member 31 and the first air collector apparatus 4 and that section of the first exhaust gas turbocharger line 35 between the check valve 37 and the first air collector apparatus 4 can likewise be configured as two separate lines, as a combined common line, or both separately in sections and as a common line in sections. That section of the second e-compressor outlet line 30 between the shut-off member 32 and the second air collector apparatus 5 and that section of the second exhaust gas turbocharger line 36 between the check valve 38 and the second air collector apparatus 5 can likewise be configured as two separate lines, as a combined common line, or both separately in sections and as a common line in sections.

If the pressurized air which is provided by the electric compressor 24 is fed from the e-compressor outlet 28 in parallel to the two air collector apparatuses 4 and 5, and therefore in addition to the pressurized air from the compressors 14 and 17, to the combustion chambers 3 of the first and second cylinder bank 1 and 2, this is called symmetrical operation of the internal combustion engine. If, in contrast, the pressurized air of the compressor 14 is fed to the first air collector apparatus 4 and the pressurized air of the compressor 17 is fed to the second air collector apparatus 5, but the pressurized air of the electric compressor 24 is fed from the e-compressor outlet 28 only to one of the two cylinder banks 1 and 2, for example only to the second air collector apparatus 5 and not to the first air collector apparatus 4, this is called asymmetrical operation of the internal combustion engine.

The inventors of the present invention have ascertained that it is advantageous for the internal combustion engine to be operated in symmetrical or asymmetrical operation in a manner which is dependent on the rotational speed of the internal combustion engine. Here, the shut-off members 26, 27, 31 and 32 make it possible that the feed of pressurized air is fed from the electric compressor 24 selectively only to one cylinder bank 1, 2 or to the two cylinder banks 1, 2.

If pressurized air is to be fed from the electric compressor to the two air collector devices 4 and 5, all of the shut-off members 26, 27, 31 and 32 are open. If pressurized air is to be fed from the electric compressor 24 only to the first air collector device 4, the shut-off members 26 and 31 are open and the shut-off members 27 and 32 are closed. If pressurized air is to be fed from the electric compressor 24 only to the second air collector device 5, the shut-off members 26 and 31 are closed and the shut-off members 27 and 32 are open.

The shut-off members 26, 27, 31 and 32 are preferably controlled in such a way that all the shut-off members 26, 27, 31 and 32 are open in a rotational speed range of the internal combustion engine up to and including 1500 rpm, with the result that the internal combustion engine is operated symmetrically. Furthermore, the shut-off members 26, 27, 31 and 32 are controlled in such a way that the internal combustion engine is operated asymmetrically in a rotational speed range of the internal combustion engine above 1500 rpm: here, for example, the shut-off members 26 and 31 are closed and the shut-off members 27 and 32 are open. As an alternative, only the shut-off member 31 might also be closed and the remaining shut-off members 26, 27 and 32 might be open, or only the shut-off member 32 might be closed and the remaining shut-off members 26, 27 and 31 might be open.

Figure 2:
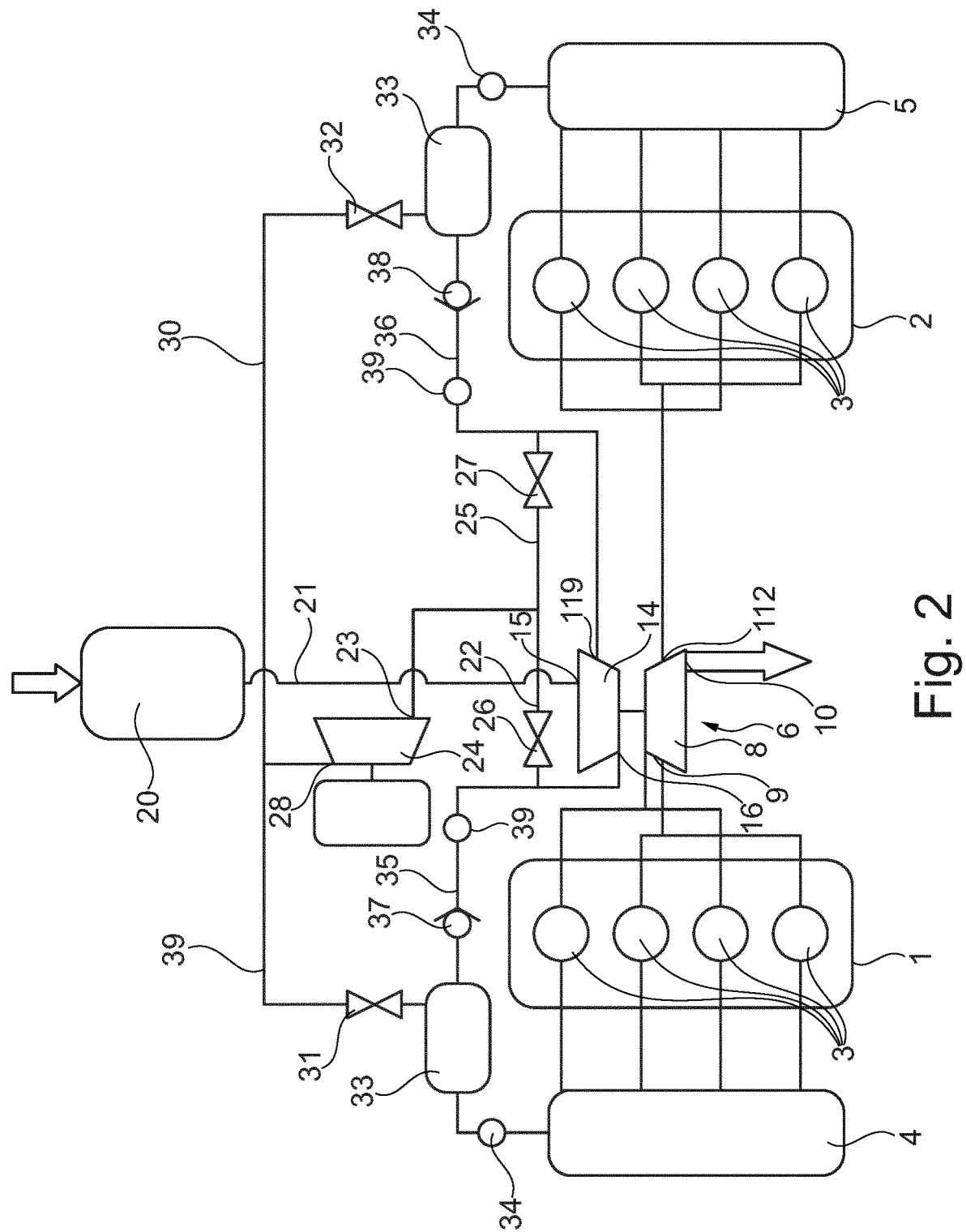

FIG. 2 diagrammatically shows an internal combustion engine in accordance with another exemplary embodiment. The exemplary embodiment which is shown in FIG. 2 differs from the exemplary embodiment which is shown in FIG. 1 merely in that only a single exhaust gas turbocharger is provided instead of two. Instead of the outlet 19, an outlet 119 is provided which is provided in addition to the outlet 16 in the exhaust gas turbocharger 6. Instead of the inlet 12, an inlet 112 is provided which is provided in addition to the inlet 9 in the exhaust gas turbocharger 6. In order to avoid repetitions, reference is otherwise made to the description of the exemplary embodiment which is shown in FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine, comprising:
   a first cylinder bank and a second cylinder bank, a plurality of combustion chambers being configured in each of the cylinder banks;
   a first air collector apparatus which is assigned to the first cylinder bank and from which air can be fed to the combustion chambers of the first cylinder bank;
   a second air collector apparatus which is assigned to the second cylinder bank and from which air can be fed to the combustion chambers of the second cylinder bank;
   an electric compressor with an e-compressor inlet and an e-compressor outlet;
   at least one exhaust gas turbocharger, in each case with a turbine and a compressor, an exhaust gas turbocharger/e-compressor line leading from an outlet of the compressor to the e-compressor inlet;
   a first e-compressor outlet line, via which the e-compressor outlet is connected to the first air collector apparatus;
   a second e-compressor outlet line, via which the e-compressor outlet is connected to the second air collector apparatus; and
   a first shut-off member which is arranged in the first e-compressor outlet line and by way of which a throughflow through the first e-compressor outlet line is at least selectively released and shut off.

2. The internal combustion engine according to claim 1, wherein
   in each case one exhaust gas turbocharger line leads from the outlet of the compressor to the first and second air collector apparatus, and a check valve is arranged in each of the exhaust gas turbocharger lines, which check valve shuts off a flow from the air collector apparatuses to the outlet of the compressor.

3. The internal combustion engine according to claim 1, further comprising two exhaust gas turbochargers, a first exhaust gas turbocharger and a second exhaust gas turbocharger, wherein
   a first exhaust gas turbocharger/e-compressor line leads from an outlet of the compressor of the first exhaust gas turbocharger to the e-compressor inlet,
   a second exhaust gas turbocharger/e-compressor line leads from an outlet of the compressor of the second exhaust gas turbocharger to the e-compressor inlet,
   a second shut-off member is arranged in the first exhaust gas turbocharger/e-compressor line, by way of which second shut-off member a flow through the first exhaust gas turbocharger/e-compressor line can at least be released and shut off.

4. The internal combustion engine according to claim 3, wherein
   a third shut-off member is arranged in the second e-compressor outlet line, by way of which third shut-off member the throughflow through the second e-compressor outlet line can at least be released and shut off, and
   a fourth shut-off member is arranged in the second exhaust gas turbocharger/e-compressor line, by way of which fourth shut-off member the throughflow through the second exhaust gas turbocharger/e-compressor line can at least be released and shut off.

5. The internal combustion engine according to claim 3, wherein
   a first exhaust gas turbocharger line leads from the outlet of the compressor of the first exhaust gas turbocharger to the first air collector apparatus,
   a second exhaust gas turbocharger line leads from the outlet of the compressor of the second exhaust gas turbocharger to the second air collector apparatus, and
   a check valve is arranged in the first exhaust gas turbocharger line and in the second exhaust gas turbocharger line, which check valve in each case shuts off a flow from the air collector apparatuses to the outlets of the compressors.

6. The internal combustion engine according to claim 4, wherein
   a first exhaust gas turbocharger line leads from the outlet of the compressor of the first exhaust gas turbocharger to the first air collector apparatus,
   a second exhaust gas turbocharger line leads from the outlet of the compressor of the second exhaust gas turbocharger to the second air collector apparatus, and
   a check valve is arranged in the first exhaust gas turbocharger line and in the second exhaust gas turbocharger line, which check valve in each case shuts off a flow from the air collector apparatuses to the outlets of the compressors.

7. A method for operating an internal combustion engine with a first cylinder bank and a second cylinder bank, a plurality of combustion chambers being configured in each of the cylinder banks, the method comprising:
   feeding air from a first air collector apparatus which is assigned to the first cylinder bank into the combustion chambers of the first cylinder bank;
   feeding air from a second air collector apparatus which is assigned to the second cylinder bank into the combustion chambers of the second cylinder bank;
   feeding air from a compressor of at least one exhaust gas turbocharger to an e-compressor inlet of an electric compressor;
   in a first rotational speed range of the internal combustion engine, feeding air from an e-compressor outlet of the electric compressor to the first and second air collector apparatus;
   in a second rotational speed range of the internal combustion engine, feeding air from the e-compressor outlet of the electric compressor to the second air collector apparatus, while the feed of air from the e-compressor outlet of the electric compressor to the first air collector apparatus is stopped by selectively activating a shut-off member.

8. The method according to claim 7, wherein
   the first operating range is active at least in a rotational speed range of from 600 to 900 rpm of the internal combustion engine.

9. The method according to claim 8, wherein
   the second operating range is active at least in a rotational speed range of from 1700 to 1800 rpm of the internal combustion engine.

10. The method according to claim 7, wherein
    the second operating range is active at least in a rotational speed range of from 1700 to 1800 rpm of the internal combustion engine.

11. A motor vehicle comprising an internal combustion engine according to claim 1.

\* \* \* \* \*